May 8, 1956 YEO PAY YU 2,745,004

VARIABLE PULSE DELAY CIRCUIT

Filed Oct. 6, 1952 4 Sheets-Sheet 1

INVENTOR.
YEO PAY YU
BY Darby & Darby
ATTORNEYS

INVENTOR.
YEO PAY YU
BY Darby & Darby
ATTORNEYS

INVENTOR.
YEO PAY YU
BY Darby & Darby
ATTORNEYS

May 8, 1956 YEO PAY YU 2,745,004

VARIABLE PULSE DELAY CIRCUIT

Filed Oct. 6, 1952 4 Sheets-Sheet 4

INVENTOR.
YEO PAY YU

BY Daly & Daly

ATTORNEYS

United States Patent Office
2,745,004
Patented May 8, 1956

2,745,004

VARIABLE PULSE DELAY CIRCUIT

Yeo Pay Yu, Passaic, N. J., assignor to Allen B. Du Mont Laboratories, Inc., Clifton, N. J., a corporation of Delaware Application October 6, 1952, Serial No. 313,292

6 Claims. (Cl. 250—27)

This invention relates to a variable pulse delay circuit useful in high-speed oscillographs for establishing the coincidence of the sweep and a given signal with a minimum of time jitter or variation in length of the delay.

This circuit has been proven to be particularly useful for the application of sweep trigger delay in high-speed oscillographs, as well as for measuring the time interval between two signals in radar or loran systems. The usual causes of time jitter in conventional time delay circuits such as variations of cut-off characteristics of tubes, noise, hum and fluctuations of supply voltages can not affect the accuracy of this circuit.

It is an object of this invention to provide means for delaying a pulse for a specific length of time and to insure the repetition of this delay with a time jitter less than 0.0001 microsecond.

It is a further object of this invention to provide an adjustable amount of time delay as for instance a total time delay of 100 microseconds adjustable in steps of one microsecond.

These and other objects will become apparent from a study of the specification in connection with the attached drawings, in which.

Figure 1:
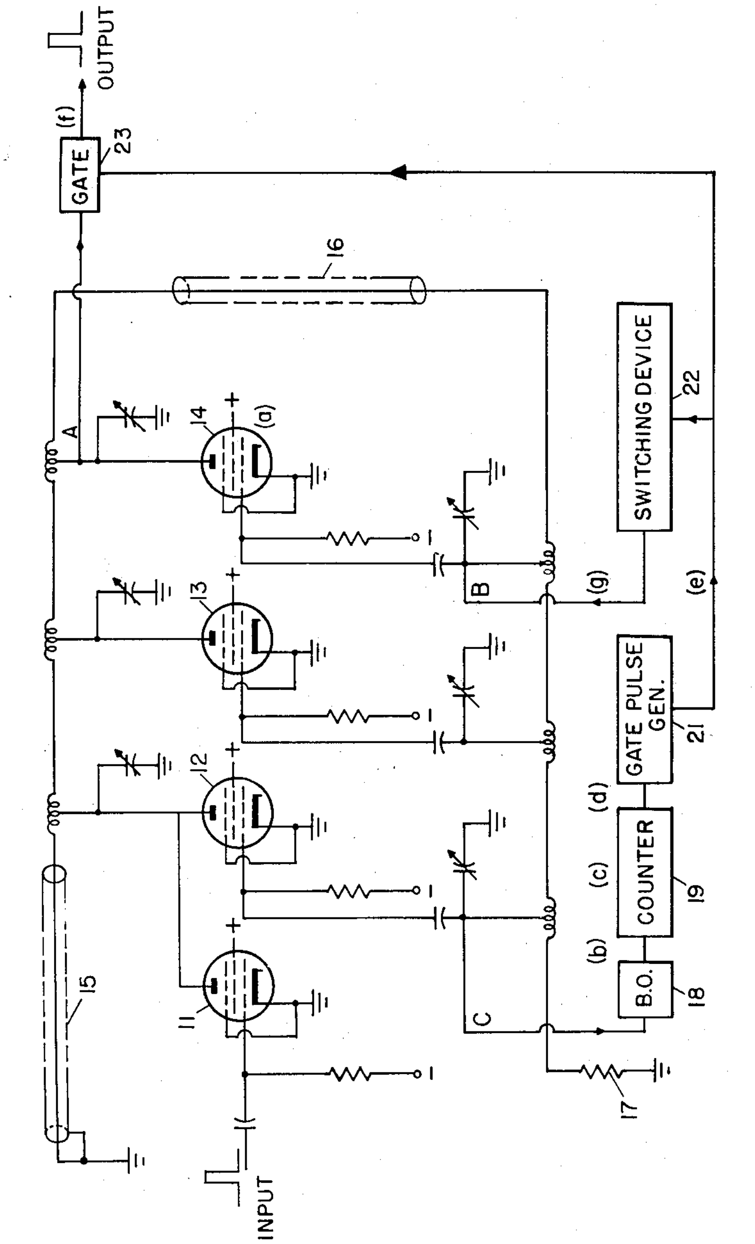
Fig. 1 is a simplified block diagram partly schematic of the circuit of the invention.
Figure 5:
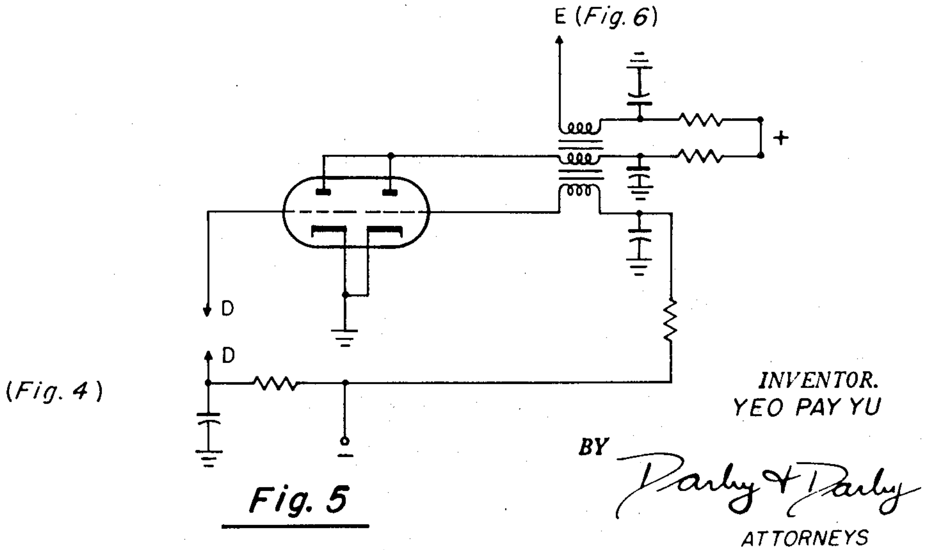
Figure 6:
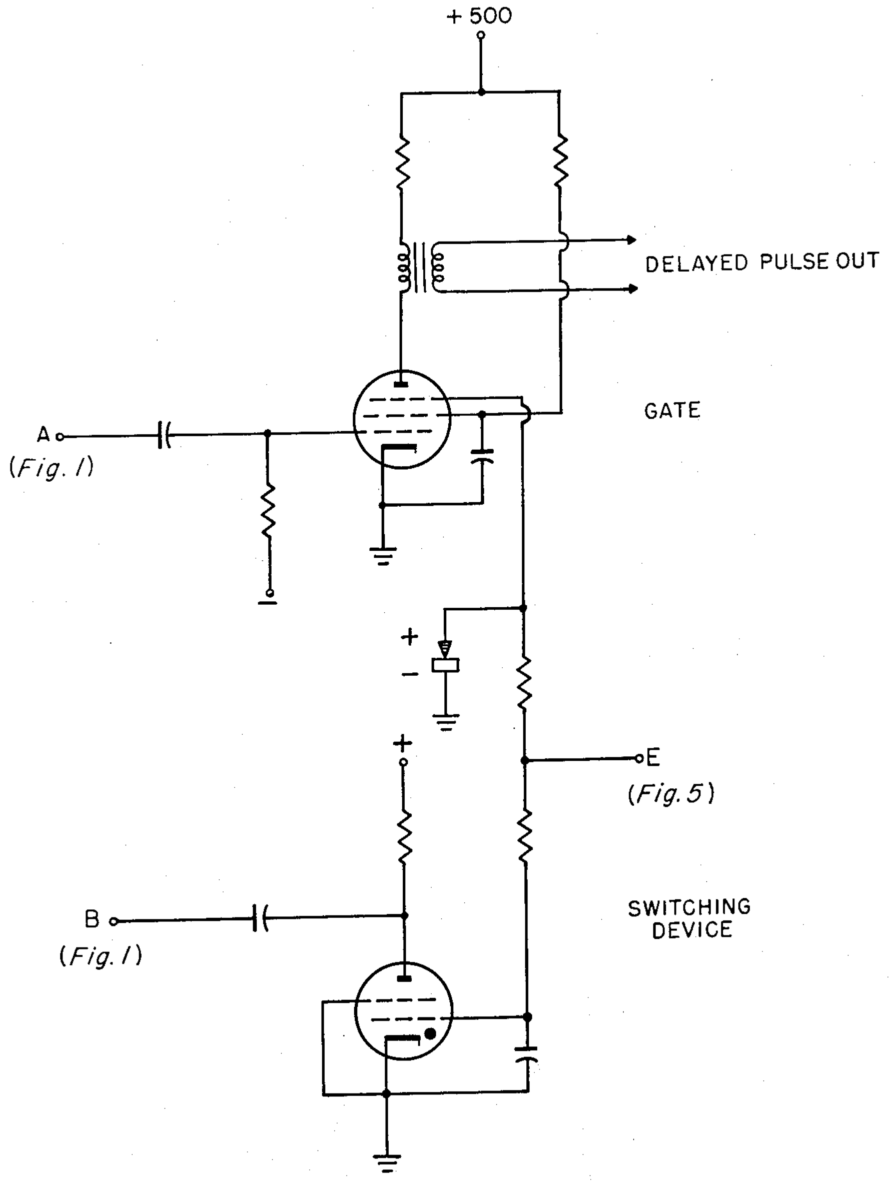

Fig. 5 is a schematic diagram of the gate pulse generator 21 shown in Fig. 1, and Fig. 6 is a schematic diagram of the gate 23 and the switching device 22 shown in Fig. 1.

The principle of operation of the invention is based on the finite time of transmission of a pulse over a transmission line. By employing two sections of line with the plate circuits of a distributed amplifier connected between them and the grid circuits of this amplifier connected beween the second section and a termination, a pulse may be made to circulate from one end of the system to the other. By means of suitable counting and gating circuits, pulses may be extracted from the system with various delay times and by reducing the gain of the amplifier, the circulation of the pulse may be terminated.

The operation is as follows:

Referring to Fig. 1, tube 11 serves as an input preamplifier, and tubes 12, 13 and 14 are connected as a distributed amplifier between two short sections of coaxial transmission line 15 and 16 and between the second section and a terminating resistor 17. The first coaxial line is short-circuited at its far end.

Figure 2:
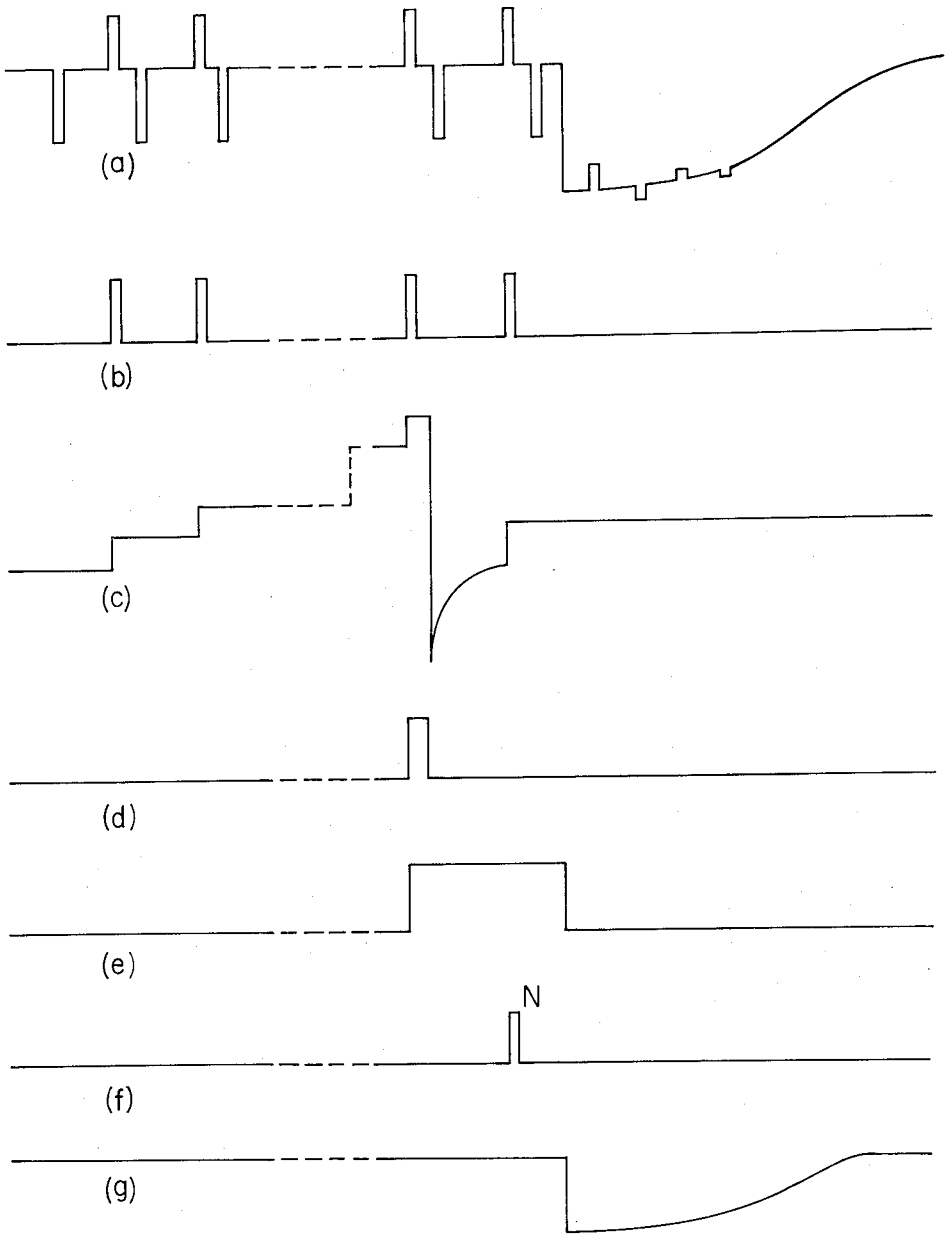
Fig. 2 is a diagram of waveforms existing at various parts of the circuit of Fig. 1.
Figure 3:
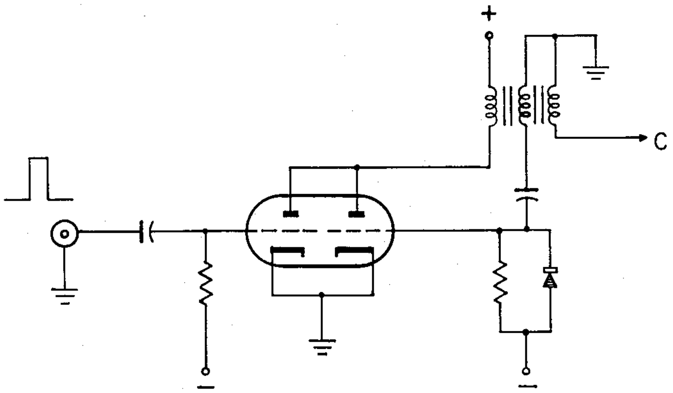
Fig. 3 is a schematic diagram of the blocking oscillator 18 shown in Fig. 1.
Figure 4:
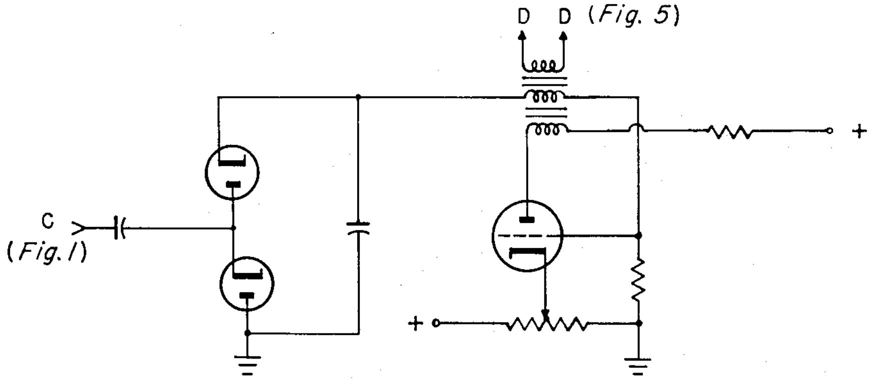
Fig. 4 is a schematic diagram of a typical counter as shown at 19 at Fig. 1.

A positive signal pulse is applied to the grid of amplifier tube 11. A negative pulse then appears at the plate of this tube and travels to both ends of the line. The pulse to line 16 is finally absorbed by terminating resistor 17. The presence of this negative pulse on the grids of tubes 12, 13 and 14 has no effect since these are already biased to cut-off. The pulse to line 15 is reflected back as a positive pulse due to the short-circuited end of line 15. This reflected positive pulse then travels through the plate circuits of tubes 12, 13 and 14, having no effect since these tubes are cut off, and through line 16 and is applied successively to the grids of tubes 14, 13 and 12, causing an amplified negative pulse to appear at the plates of these tubes. When the pulse reaches the grid circuit of tube 12, it is also applied to the blocking oscillator 18, causing a positive pulse of fixed amplitude to be generated as at (*b*) in Fig. 2, this pulse being applied to the counter 19.

The negative pulse appearing at the plate of tube 14 travels to both line 15 and line 16. The pulse which travels to line 16 is finally absorbed by resistor 17. The pulse which travels to line 15 reaches the plate circuit of tube 13 at the same time the reflected positive pulse reaches the grid of this tube and consequently has added to it the negative pulse produced by tube 13 and continues toward line 15 in amplified form. The pulse which travels to line 16 from tube 13 is finally absorbed by resistor 17. The augmented negative pulse travelling to line 15 reaches tube 12 at the same time as the original reflected positive pulse reaches its grid. Thus there occurs a further augmentation of the negative pulse travelling to line 15. As before the pulse which travels to line 16 from the plate of tube 12 is finally absorbed by resistor 17.

The augmented negative pulse travelling to line 15 passes down line 15 and is reflected as a positive pulse from the short-circuited end. The left side of Fig. 2*a* shows both the incident (negative) and reflected (positive) pulses at the plate of tube 12. The positive pulse travels back and through line 16 to the grids of the aforementioned tubes causing the same action as described above and thence to resistor 17 where it is dissipated. At the same time it triggers the blocking oscillator 18, which generates a single positive pulse of constant amplitude for each positive reflection produced by the short-circuited end of line 15, as shown in Fig. 2*b*. The counter circuit registers the number of reflections and when a predetermined number is reached triggers the gate pulse generator 21.

The gate pulse generator generates a pulse (*e* in Fig. 2) which actuates the gate circuit at 23, and also actuates the switching device 22. When the gate 23 is actuated, a pulse is passed to the output, as shown at (*f*) in Fig. 2. At the termination of the gate pulse (*e*), the switching device is actuated which generates a pulse as shown as (*g*) in Fig. 2. This pulse drives the grids of tubes 14, 13 and 12 sufficiently beyond cut-off for an adequate time to stop recirculation of the pulse in the system until the next initiating pulse appears at the input of tube 11. The manner in which the pulses in the system die out is shown on the right hand side of Fig. 2(*a*). Thus the original pulse appears at the output delayed a finite amount from its introduction at the input.

The above described system possesses much higher stability than conventional time delay circuits for the following reasons: The signal pulse travels back and forth in lines 15 and 16 the attenuation of which is compensated by the distributed amplifier tubes 12, 13 and 14 and finally is delivered to the output through the gate 23. Thus the time delay is accomplished exclusively by linear bilateral elements, which include lines 15 and 16 and inductances and capacitances at the grids and plates of tubes 12, 13 and 14. Accordingly, the output pulse is the same one that has been fed into the system unlike most other electronic delay systems of which the output pulse is a new pulse generated in the system. Any variation in cut-off characteristics of electron tubes, noise, hum, temperature changes, and changes in supply voltages, which cause a major portion of time jitter in conventional electron tube delay circuits may produce time jitter only in the gate pulse and the switching pulse but cannot alter the number of reflections in lines 15 and 16. Furthermore, by maintaining both the incident and reflected pulses in lines 15 and 16 at a high level, above 50 volts, and by keeping the characteristic impedance of both lines 15 and 16 below 1000 ohms, noise, hum, or echoes due to imperfect matching can be eliminated when a high negative bias is applied to tubes 12, 13, 14.

The detailed circuit diagrams of Figs. 3, 4, 5 and 6 illustrate typical components of Fig. 1 which are connected together at the lettered points A, B, C, D and E in the figures.

While I have described one specific embodiment of my invention it will be apparent that many modifications may be made and I wish therefore not to be limited by the foregoing description, but on the contrary only by claims granted to me.

What is claimed is:

1. A variable pulse delay circuit comprising a first inductive line, a first delay line having a near end and a far end, said near end being connected to one end of said first inductive line, said far end being short circuited, a second delay line having a near end and a far end, said near end of said second delay line being connected to the other end of said first inductive line, a plurality of thermionic tubes having the anodes of each thereof connected to different points respectively of said first inductive line intermediate said delay lines, a second inductive line connected to the far end of said second delay line, each said thermionic tube having a control electrode connected to respective different points on said second inductive line, and a source of pulses, said source being connected to the anode of a first of said thermionic tubes.

2. The apparatus of claim 1, including a counter circuit connected to the other end of said second inductive line and coupled to said control electrodes of others of said thermionic tubes to produce a pulse to vary the bias of said other thermionic tube thereby to block pulses in said circuit.

3. The apparatus of claim 2, including a gating circuit connected to the anode of one of said other thermionic tubes and coupled to said counter circuit, thereby to pass a pulse from said circuit during a given time.

4. The variable pulse delay circuit of claim 1 and including a gating circuit connected to the anode of one of said thermionic tubes, and means comprising a gate pulse generator to control the passage of signals through said gating circuit.

5. A variable pulse delay circuit which comprises a first delay line connected to a distributed amplifier comprising a first plurality of tapped inductances connected in series and inductively coupled to one another, a plurality of electron discharge devices each having a cathode, a control grid and an anode, the anodes of each said electron discharge device being connected sequentially to the taps of said tapped inductances, the final said tapped inductance being connected to a second delay line, the tap of said final tapped inductance being connected also to a gating circuit, said second delay line being connected to a second plurality of tapped inductances connected in series and inductively coupled to one another, the control grids of said plurality of electron discharge devices being coupled sequentially to the taps of said second plurality of tapped inductances, the final said tapped inductance of said second plurality of tapped inductances being connected also to a blocking oscillator circuit, a counter circuit connected to said blocking oscillator, a gate pulse generator connected to said counter circuit, the output of said gate pulse generator being connected to said gating circuit whereby pulses are allowed to pass to the output.

6. The apparatus of claim 5, including a switching device connected to said gate pulse generator and to said gating circuit, whereby a pulse is permitted to pass through said gating circuit and the circulation of pulses in said variable pulse delay circuit is terminated.

References Cited in the file of this patent

UNITED STATES PATENTS

| | | |
|---|---|---|
| 2,172,354 | Blumlein | Sept. 12, 1939 |
| 2,263,376 | Blumlein et al. | Nov. 18, 1941 |
| 2,617,930 | Cutler | Nov. 11, 1952 |
| 2,627,574 | Feldman | Feb. 3, 1953 |
| 2,670,408 | Kelley | Feb. 23, 1954 |